United States Patent [19]
Rantanen

[11] Patent Number: 5,622,251
[45] Date of Patent: Apr. 22, 1997

[54] TRANSFER DEVICE FOR PERFORMING A LINEAR TRANSFER MOVEMENT

[75] Inventor: Matti Rantanen, Kirkkonummi, Finland

[73] Assignee: Orion-Yhtyma OY, Espoo, Finland

[21] Appl. No.: 371,792

[22] Filed: Jan. 12, 1995

[30] Foreign Application Priority Data

Jan. 14, 1994 [FI] Finland .................................. 940204

[51] Int. Cl.[6] .................................. B65G 25/08
[52] U.S. Cl. .................................. 198/747; 74/89.15
[58] Field of Search .................. 414/749; 198/465.1, 198/747, 750.1, 803.01; 74/89.15, 125.5, 127

[56] References Cited

U.S. PATENT DOCUMENTS

| | | | |
|---|---|---|---|
| 3,146,879 | 9/1964 | Montagino | 198/747 |
| 4,118,116 | 10/1978 | Koontz et al. | 198/803.01 X |
| 4,502,585 | 3/1985 | Sticht | 198/465.1 X |
| 4,526,505 | 7/1985 | Mally et al. | 198/747 X |
| 4,567,979 | 2/1986 | Hoehn | 198/747 X |
| 4,615,274 | 10/1986 | Hoehn | 198/465.1 X |
| 5,331,861 | 7/1994 | Joffe | 74/89.15 |

*Primary Examiner*—James W. Keenan
*Attorney, Agent, or Firm*—Jay H. Maioli

[57] ABSTRACT

The invention relates to a transfer device for performing a regular, linear transfer movement including a body (1), provided with a threaded bar (2), a stepping motor (3) for driving the threaded bar (2), two guide bars (4, 5), a slide (6), and a follower (7) connected to it. The slide (6) is moved along the guide bars (4, 5) by the follower (7), which transforms the rotational movement of the threaded bar (2) into a linear transfer movement. The object to be transferred with the transfer bar (2) is attachable to the slide (6). The invention is characterized by the fact that the slide (6) includes an opening (8), through which the threaded bar (2) is fitted to pass with some play, and in connection with the opening (8) there is a follower (7), having a tongue (9), which is fitted to follow the threaded groove (10) of the threaded bar (2), so that the rotational movement (A, B) of the threaded bar is transformed into a linear movement of the slide (6) via the follower (7).

9 Claims, 2 Drawing Sheets

TRANSFER DEVICE FOR PERFORMING A LINEAR TRANSFER MOVEMENT

BACKGROUND OF THE INVENTION

This invention relates to a transfer device for performing a regular, linear transfer movement.

DESCRIPTION OF THE PRIOR ART

The transfer device of the invention is devised particularly for transferring a picture plate used in X-raying, in order to read the information on the plate. In this case, the X-radiation having been conducted through the object to be X-ray photographed and modified by absorption in the object, is directed to an activated fluorescent layer on the image plate, into which the information of the plate is recorded. After this exposure step, the plate is read by means of a separate reader, the information being unpacked by means of a laser beam into a picture, shown on a computer screen or put out as a film. In practice, the picture plate is read by shifting the plate from the cassette to a reading station, where its information is read while the plate is in optimally uniform, linear movement. Having been read, the plate is taken to a clearing station, where it is cleared of information by means of a powerful light, and eventually it is reinserted into the cassette in view of the next operation.

Finnish patent application 903796 describes a linear pulling device, designed especially for the transfer of an exposed slide disc, which is withdrawn from a RIM cassette used in X-raying, in view of reading the information on the disc. The pulling device comprises a slide grasping the disc, which is in linear movement into opposite directions on a rotatable shaft, the slide withdrawing the disc from the cassette and reinserting it such that the information is read and blanked out while the disc is moving back and forth. The linear transfer of the slide is provided by pull bearings, fitted in an ascending angle to the rotatable shaft, and a separate guide, stopping the slide from rotating along with the slide. The pull bearings are ball bearings, fitted into two sets around the shaft, and consisting of three parallel bearings each. These sets of bearings, fitted successively in the longitudinal direction of the shaft, support the slide, keeping it straight during its oscillating transfer movement.

The pulling device described above has, however, the inconvenience of the pull bearings leaking oil, due to their position and to the force exerted against their outer periphery, and the oil subsequently reaches the rotatable shaft, which consequently will attract impurities on its surface from the environment. The problem is further accentuated by the fact that the drive shaft end is supported by multilayer-bearings, from which plenty of teflon fragments come off in use, and these teflon fragments eventually reach the oily surface of the drive shaft. As the pull bearings press the impurities and fragments sticking to the shaft surface even tighter to this surface, the linearity of the transfer movement of the pull nut will suffer, thus impairing the quality of the picture to be read from the RIM disc.

Finnish patent specification 90472 discloses a second linear pulling device, especially devised for transferring an exposed slide disc, which is withdrawn from a RIM cassette used in X-raying, in view of reading the information on the disc, and aiming to eliminate the drawbacks of the pulling device described in the FI patent application above. Apart from the slide, the design of this pulling device corresponds to that of the pulling device of the patent application mentioned above. In this case, the slide comprises three pull bearings, fitted in parallel about a rotatable shaft, and an annular cleansing slide bearing surrounding the shaft, which is made of a porous material containing oil, so that the pull bearings and the slide bearing co-operate in supporting the mobile slide on the shaft.

The pulling device described above still has the inconvenience of the pull bearings leaking oil, due to their position and the force exerted against their outer periphery, the oil subsequently reaching the rotatable shaft, which consequently will attract impurities on its surface from the environment. The shaft surface is cleansed by means of the slide bearing, it is true, however, in the course of time, the slide bearing will wear and loose its tightness. As a result, the shaft surface will attract new impurities, affecting the regularity of the linear movement of the slide and impairing the quality of the picture to be read from the disc.

SUMMARY OF THE INVENTION

The object of this invention is to provide a new transfer device, by means of which the drawbacks above are eliminated, the device being transferred with higher precision and regularity, and also with greater reliability. These objectives are achieved by means of the characteristic features of the invention set out below.

The transfer device of the invention comprises a body, provided with a threaded bar, an electric motor, such as a stepping motor for driving the threaded bar, two guide bars, a slide and a follower attached to it, the slide being taken along the guide bars by means of the follower, which again transforms the rotational motion of the threaded bar into a linear transfer movement, and the object to be transferred by the transfer device being attachable to the slide. The transfer device of the invention is characterised by the fact that the slide comprises an opening, through which the threaded bar is disposed to pass with some play, and in connection with the opening there is a follower, comprising a tongue, fitted to follow the threaded groove of the threaded bar, the rotational motion of the threaded bar being transformed via the follower into a linear movement of the slide.

The transfer device of the invention has the advantage of enabling an exact and regular linear movement to be performed by means of mechanical structural solutions, which are both simple and economical. The transfer device of the invention has the further advantage of the follower fitted on the slide abrasing the threaded groove in the rotating threaded bar, removing impurities at the same time. Thus, any tiny impurities in the threaded bar will not substantially affect the movement of the follower, nor that of the slide. A third advantage is that the follower is attached flexibly to the slide, the tongue of the follower being pressed flexibly into the threaded groove of the threaded bar. Finally, any tiny impurities at the bottom of the threaded groove will not either affect the transfer movement substantially, owing to the adequate design of the tongue.

The transfer device of the invention is particularly suitable as a conveyor for a picture plate used in X-raying, which is subject to surprisingly strict operation requirements with regard to linear movement. Using the transfer device of the invention as a picture plate conveyor eliminates a major problem relating to the handling of the picture plate, i.e. lines appearing on the picture while it is being read. This embodiment of the transfer device has the further advantage of a fairly small size, a simple structure, easy installation and service, and reliable operation. This having been said, we note that the transfer device of the invention is applicable also for other high-precision purposes of use, which require optimally regular and exact linearity in the transfer of an object.

The invention will be described in further detail below, with reference to the enclosed drawings, in which

DESCRIPTION OF PREFERRED EMBODIMENT

Figure 1:
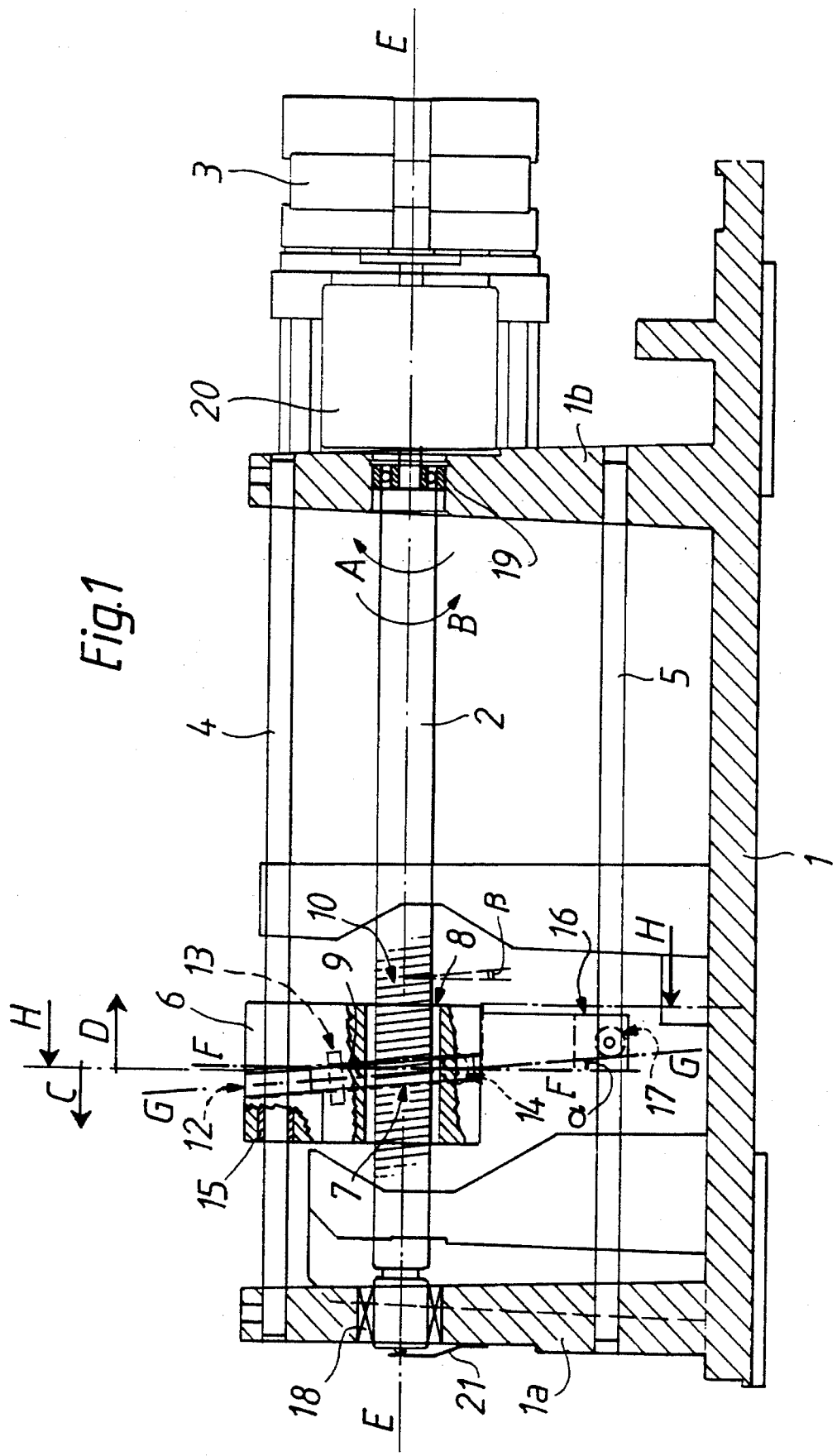
FIG. 1 is a partly sectional lateral view of the transfer device according to the invention.
Figure 2:
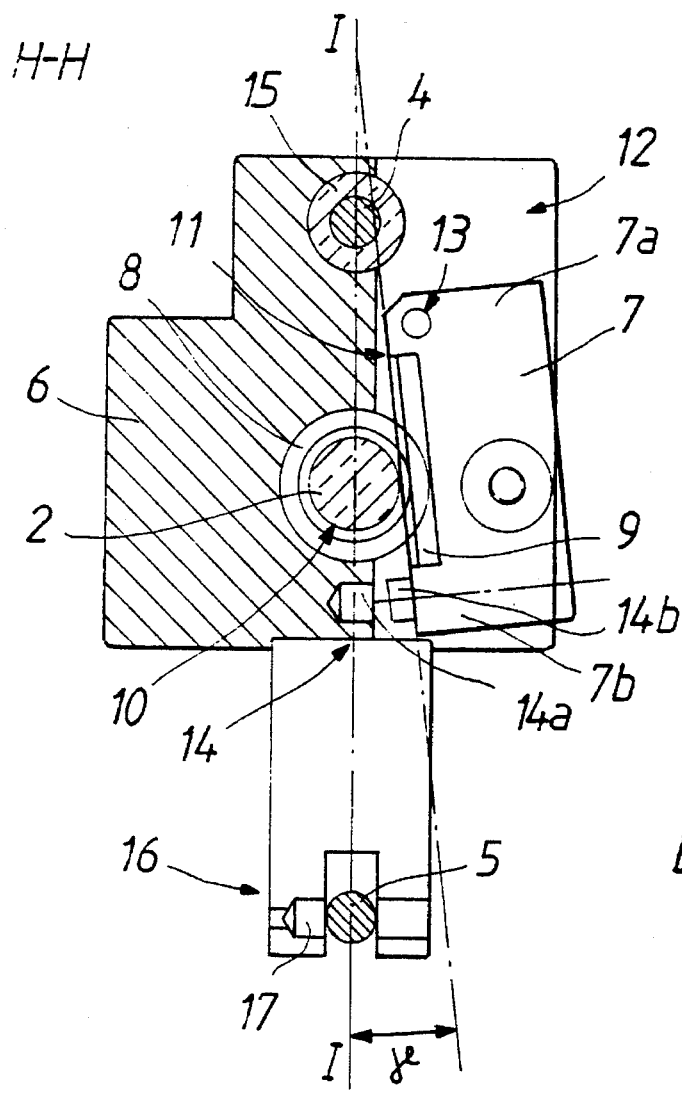
FIG. 2 is a cross-sectional view of the transfer device of FIG. 1 along line H—H.

The transfer device according to the invention for performing a regular linear transfer movement is illustrated in FIGS. 1 and 2. This transfer device comprises a body 1, provided with a threaded bar 2, an electric motor, such as a stepping motor 3, for driving the threaded bar 2, two guide bars 4, 5, a slide 6 and a follower 7 attached to this. The slide 6 is moved along the guide bars 4,5 by means of the follower 7. The follower 7 transforms the rotational motion A, B of the threaded bar 2 into a linear transfer movement C, D. The object to be transferred with the transfer device, such as a picture plate used in X-raying, is attached to the slide 6. Regarding this embodiment, we refer for instance to the applicant's Finnish patent specification 90472.

The guide bars 4,5 and the threaded bar 2 mentioned above are inserted between the support members 1a, 1b of the body substantially in parallel. The threaded bar 2 is mounted in the support members 1a, 1b on the slide bearings 18 and the slotted ball bearing 19. The first end of the threaded bar 2 is provided with a coupler 20, through which the stepping motor 3 is connected to the threaded bar 2. The second end of the threaded bar 2 is provided with a disc spring 21, operating in its longitudinal direction and attached to support member 1a of the body. The disc spring 21 prevents the threaded bar 2 from moving in the direction of its longitudinal axis.

The slide 6 of the transfer device is fitted to move along guide bars 4, 5 attached to the body 1. The slide 6 comprises an opening 8, through which the threaded bar 2 is fitted to pass with some play. The diameter of the opening 8 is thus greater than that of the threaded bar 2. The follower 7 is fixed to the slide 6. In this case the follower 7 is a rectangular, preferably flat, plate-like member. The slide 6 has a groove 12, in which the follower 7 is fitted so as to be in connected with the opening 8. The groove 12 is fitted in the slide 6 so as to extend transversely to the guide bars 4, 5 and the threaded bar 2, through the slide 6, from the top to the bottom, in one half of it, so as to cut the opening 8. The groove 12 has a width slightly greater than the thickness of the follower 7. In this case, the follower 7 is disposed on the slide 6 laterally with regard to the threaded bar 2.

Figure 3:
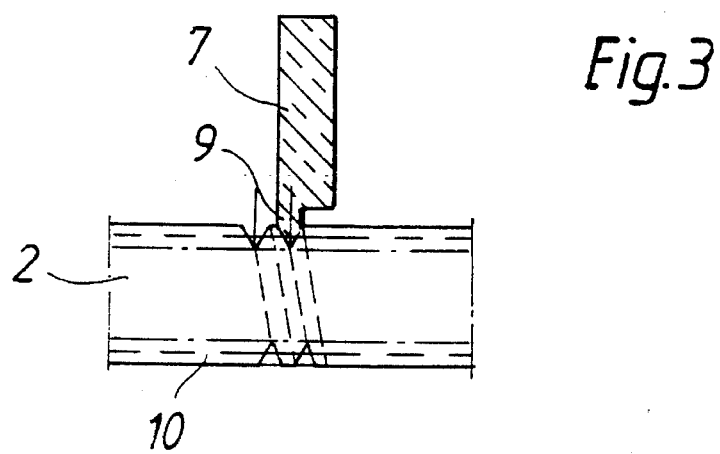
FIG. 3 shows a detail in the connection between the follower and the threaded bar.

On one longitudinal edge 11 of the follower 7 a tongue 9 is provided. The follower 7 and its tongue 9 are fitted in an angle $\alpha$ to the plane F—F perpendicular to the longitudinal axis E—E of the threaded bar 2, which equals the ascending angle $\beta$ of the threaded groove 10 of the threaded bar 2. The follower 7 being a flat plate-like member in this case, the groove 12 is also in a corresponding angle $\alpha$ to the threaded bar 2. The tongue 9 is fitted into the threaded groove 10 of the threaded bar 2 at the opening 8 of the slide 6, when the transfer device is ready for use. The tongue 9 of the follower 7 has a wedge-like cross-section and a shape and a size that essentially match the threaded groove 10, as illustrated in FIG. 3. The width of the tip of the tongue 9 is essentially equal to the distance between the ridges of the threaded groove 10, such that the tongue 9 bears against the thread ridges located in the threaded groove essentially on both sides, without any essential play. The tip of the tongue 9 has preferably been cut as a plane surface, or rounded so as not to extend to the bottom of the threaded groove 10. In this case, the tongue 9 is parallel to the edge 11 of the follower 7, and the tongue 9 is straight in its longitudinal direction and in the plane G—G of the follower 7. The tongue can be given a design such to be curved also in the plane G—G, however, in terms of production technology, a straight tongue is preferable.

In this embodiment example, the follower 7 is located in the slide 6 at the side of the threaded bar 2, as illustrated in FIGS. 1 and 2. The tongue 9 is then substantially vertical, however in a substantially smaller angle $\gamma$, such as in the range of 5° to 15°, to the plane I—I passing through the longitudinal axes of the guide bars 4,5 and the threaded bar 2, at the side of the threaded bar 2. The first end 7a of the follower 7 is provided with a fixing member 13, by means of which the follower is rotatably fixed to the slide 6 and its groove 12. The follower 7 and its tongue 9 are then rotatable relative to the fixing member in the plane G—G. The follower 7 also comprises a loading device 14, by means of which the follower 7 and its tongue 9 are pressed into the threaded groove 10 of the threaded bar 2, with the said fixing member 13 as a bearing point. This arrangement preferably provides for two positions for the follower, into which it may be swung with the fixing member 13 as a bearing point: in the first position, the follower 7 bears against the threaded bar 2, more particularly the tongue 9 rests against the threaded groove 10, and in the second position, the follower 7 is released from the threaded bar 2, the tongue 9 being outside the threaded groove 10, and the rotation of the threaded bar 2 being unable to affect the follower 7 or the slide 6.

The loading device 14 is preferably a magnetic device. The actual magnet 14a of the magnetic device is attached to the slide 6 and its counterpart 14b at a point corresponding to the magnet 14a, in connection with one end 7b of the follower, as illustrated in FIG. 2. A magnetic device has the advantage of a maximum load when the tongue 9 is fitted into the threaded groove 10, and the load diminishes as the tongue 9 is withdrawn from the threaded groove 10 by rotating the follower 7 away from the threaded bar 2. The load exerted by the magnetic device acting as loading device 14 will decrease as the tongue 9 moves away from the threaded groove 10. The magnetic device has thus the advantage of allowing a particularly regular linear movement. All the rotating shafts have a radial deviation, and thus the threaded bar 2 makes the loading device 14 move in the radial direction of the bar 2. While the loading device 14 is moving away from the threaded groove 10, the linear movement of the slide will slow down (in other words, the loading device 14 yields, without transforming the rotational movement directly into a linear movement). The load exerted by the magnet 14a decreasing at the same time, the load on the threaded bar 2 is reduced, and the bar tends to rotate at a higher speed. This higher speed will compensate for the decelerated linear movement of the slide 6. The magnetic device has the further advantage of allowing simple and rapid mounting and dismounting of the slide 6 and the follower 7 in the transfer device, for instance in view of service.

We point out that if a spring would be used as a loading device 14, the load exerted by the spring would increase as the loading device moves away from the threaded groove 10, which, in turn, would increase the load on the threaded bar 2, thus slowing down its movement. This would be a marked drawback, given that also the linear movement would slow down with the loading device moving away, and consequently, the regularity of the linear movement would be affected by two factors boosting each other.

The slide 6 is equipped with one or more slide bearings 15, through which the first guide bar 4 is fitted. The slide also comprises a fork member 16, the second guide bar 5 having been fitted through one branch of this. The fork member 16 comprises a magnet 17 to keep the form member 16 along with the slide 6 in contact with the second guide bar 5. To this end, the guide bar is made of steel or a similar material. The fork member 16 may be replaced with a slide bearing to bear this end of the slide 6 against the second guide bar 5. Still, a fork member 16 is a cheaper solution than a slide bearing, given that it facilitates mounting and dismounting of the transfer device, for instance during manufacture and service.

The transfer device according to the invention, which is illustrated in the enclosed drawings, operates as follows: the loading device 14 presses the follower 7 and its tongue 9 into the threaded groove 10 of the threaded bar 2 when the transfer device is ready for operation. The threaded bar 2 is rotated by means of an electric motor, such as a stepping motor 3, either clockwise A or counter-clockwise B. The tongue 9 of the follower being pressed into the threaded groove 10 of the threaded bar, and the follower 7 being attached to the slide 6, the slide 6 will follow the rotation of the threaded bar 2 and transform it into a linear movement, either into direction C or D, depending on the direction of rotation A,B. Consequently, the slide 6 glides supported by the slide bearing 15 along guide bar 4, and accordingly, along guide bar 5, retained by the magnet 17 of the fork member 16. The rate of the linear movement of the slide 6 will be determined by the rising of the threaded groove 10 of the threaded bar 2 jointly with the speed of rotation of the stepping motor 3.

The invention has been described above with reference to one of its embodiments, however, the invention may of course be varied in many ways within the scope of the enclosed claims.

What is claimed is:

1. A transfer device for performing a regular, linear transfer movement of an object, comprising a body which is provided with a threaded bar, an electric motor for driving the threaded bar, two guide bars, a slide and a follower attached to the slide, the slide being moved along the guide bars by the follower engaging the threaded bar, the follower transforming rotational movement of the threaded bar into a linear transfer movement, and the object to be transferred with the transfer device being attachable to the slide, wherein the slide comprises an opening through which the threaded bar is fitted to pass, and located at the opening is the follower, comprising a plate-like member having a tongue, fitted to follow a threaded groove of the threaded bar, wherein the tongue is disposed in an angle to a perpendicular plane of the longitudinal axis of the threaded bar, which equals an ascending angle of the threaded groove of the threaded bar.

2. A transfer device according to claim 1, wherein the slide comprises a groove into which the follower is fitted.

3. A transfer device according to claim 1, wherein the tongue has a wedge-like cross-section, and the shape and size of the tongue substantially match the threaded groove.

4. A transfer device according to claim 1, wherein the tongue is a straight member in its longitudinal direction.

5. A transfer device according to claim 1, wherein a first end of the follower is equipped with a fixing member for mounting the follower in the slide, such that the follower is rotatable in the longitudinal plane of the tongue, and the follower comprises a loading device for pressing the tongue of the follower into the threaded groove of the threaded bar, with the fixing member as a bearing point.

6. A transfer device according to claim 5, wherein the loading device is a magnetic device, which is fitted in connection with one end of the follower and the slide.

7. A transfer device according to claim 1, wherein the slide comprises slide bearings, through which the first guide bar is fitted, and a fork member through which the second guide bar is fitted.

8. A transfer device according to claim 7, wherein the fork member comprises a magnet to retain the fork member along with the slide in contact with the second guide bar.

9. A transfer device for performing a regular, linear transfer movement of an object, comprising: a body including a threaded bar, an electric motor for rotating the threaded bar, two guide bars, a slide arranged for linear transfer movement along the guide bars and having an opening formed therein through which the threaded bar passes, a follower attached to the slide at the opening therein and having a tongue for engagement with the threaded bar, the follower transforming rotational movement of the threaded bar into the linear transfer movement of the slide, wherein a first end of the follower is equipped with a fixing member for mounting the follower to the slide so that the follower is rotatable in the longitudinal plane of the tongue, and further comprising a magnetic loading device fitted in connection with a second end of follower and the slide for pressing the tongue into a threaded groove of the threaded bar with the fixing member as a bearing point.

* * * * *